US009376588B2

(12) United States Patent
Song et al.

(10) Patent No.: US 9,376,588 B2
(45) Date of Patent: Jun. 28, 2016

(54) EPOXY RESIN COMPOSITION FOR MARINE MAINTENANCE AND REPAIR COATINGS WITH IMPROVED OVERCOATABILITY

(75) Inventors: Amy Song, Shanghai (CN); Hongyu Chen, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/391,413

(22) PCT Filed: Apr. 24, 2012

(86) PCT No.: PCT/CN2012/074572

§ 371 (c)(1),
(2), (4) Date: Oct. 9, 2014

(87) PCT Pub. No.: WO2013/159279

PCT Pub. Date: Oct. 31, 2013

(65) Prior Publication Data

US 2015/0119500 A1 Apr. 30, 2015

(51) Int. Cl.

| | |
|---|---|
| ***C09D 163/00*** | (2006.01) |
| ***C08L 63/00*** | (2006.01) |
| ***C08G 59/50*** | (2006.01) |
| ***C09D 5/08*** | (2006.01) |
| ***C09D 5/16*** | (2006.01) |
| ***C09D 5/12*** | (2006.01) |
| *C08G 59/22* | (2006.01) |
| *C08G 59/24* | (2006.01) |
| *C08G 59/62* | (2006.01) |
| *B32B 27/38* | (2006.01) |
| *C09D 7/12* | (2006.01) |

(52) U.S. Cl.

CPC .......... *C09D 163/00* (2013.01); *C08G 59/5033* (2013.01); *C08L 63/00* (2013.01); *C09D 5/08* (2013.01); *C09D 5/12* (2013.01); *C09D 5/1662* (2013.01); *C09D 7/12* (2013.01)

(58) Field of Classification Search

USPC .............. 106/287.22; 428/413; 523/400, 427, 523/428

See application file for complete search history.

(56) References Cited

U.S. PATENT DOCUMENTS

| | | | | |
|---|---|---|---|---|
| 3,849,366 | A * | 11/1974 | Patrick, Jr. | 523/457 |
| 4,269,742 | A | 5/1981 | Goeke et al. | |
| 5,310,789 | A | 5/1994 | Furihata et al. | |
| 5,514,433 | A | 5/1996 | Cole | |
| 6,274,650 | B1 * | 8/2001 | Cui | 523/457 |
| 8,030,401 | B1 | 10/2011 | Klemarczyk et al. | |
| 2004/0048954 | A1 | 3/2004 | Thieben | |
| 2008/0045659 | A1 | 2/2008 | Hakuya et al. | |
| 2009/0203813 | A1 * | 8/2009 | Lee | 523/400 |
| 2009/0261484 | A1 * | 10/2009 | Kanagawa et al. | 257/793 |
| 2010/0048827 | A1 | 2/2010 | Walker et al. | |
| 2011/0152448 | A1 * | 6/2011 | Corley et al. | 524/588 |
| 2015/0080497 | A1 * | 3/2015 | Song et al. | 523/400 |

FOREIGN PATENT DOCUMENTS

| | | | |
|---|---|---|---|
| CN | 1185468 | A | 6/1998 |
| CN | 1185469 | A | 6/1998 |
| CN | 101747820 | A | 6/2010 |
| CN | 101817970 | A | 9/2010 |
| CN | 102352171 | A | 2/2012 |
| CN | 102372991 | A | 3/2012 |
| EP | 1788048 | A1 | 5/2007 |
| GB | 991905 | A | 5/1965 |
| JP | S5124631 | A | 2/1976 |
| JP | S5296641 | A | 8/1977 |
| JP | S52130832 | A | 11/1977 |
| JP | S54111536 | A | 8/1979 |
| JP | S61181875 | A | 8/1986 |
| JP | H01178571 | A | 7/1989 |
| JP | H02000690 | A | 1/1990 |
| JP | 3057639 | | 3/1991 |
| JP | 7228825 | | 8/1995 |
| JP | 8048914 | | 2/1996 |
| JP | H1045877 | A | 2/1998 |
| JP | 11315250 | | 11/1999 |
| JP | 2002128866 | A | 5/2002 |
| JP | 2002167548 | | 6/2002 |
| JP | 2003082249 | | 3/2003 |
| JP | 2004107589 | A | 4/2004 |
| JP | 2006176678 | A | 7/2006 |
| RU | 2017777 | C1 | 8/1994 |
| WO | 2004024792 | A1 | 3/2004 |
| WO | WO 2011/032120 | A2 * | 3/2011 |

OTHER PUBLICATIONS

Technical data sheet for DER 732 (no date).*
Technical data sheet for DER 736 (no date).*

* cited by examiner

*Primary Examiner* — Michael J Feely

(74) *Attorney, Agent, or Firm* — Karl E. Stauss; Cantor Colburn LLP

(57) ABSTRACT

This invention relates to an epoxy resin composition and its application in marine maintenance and repair coating with improved overcoatability.

3 Claims, 2 Drawing Sheets

EPOXY RESIN COMPOSITION FOR MARINE MAINTENANCE AND REPAIR COATINGS WITH IMPROVED OVERCOATABILITY

FIELD

This invention relates to an epoxy resin composition and its application in marine maintenance and repair coating with improved overcoatability.

BACKGROUND

Epoxy resin is considered as the most cost-effective binder for anti-corrosion coating due to its excellent adhesion to metal, mechanical rigidity and chemical resistance properties. Epoxy primers are usually overcoated by a variety of topcoats, including solvent or water based epoxy, acrylate, polyurethane, polysiloxanes or other functional finishes.

There is an optimum time for epoxy to be overcoated, within this period no additional surface preparation is required. After the "overcoat window" has passed, the primer will need to be abraded before it can be topcoated, which is an expensive and labor-consuming process.

Overcoat window varies in each system according to the specific material and conditions applied. Temperature has significant influence on the overcoat window. 7 to 14 days are the typical overcoat window in most cases. Overcoating beyond the overcoat window will lead to weak intercoat adhesion and even paint failure, which causes significant scheduling issues or rework in the industry hampering throughput.

It is therefore, still interesting in the art to develop a coating having balanced overcoat window time and anti-corrosion properties.

SUMMARY

The present invention provides a curable composition comprising, based on the total weight of the curable composition: a) from 1 wt. % to 20 wt. % an epoxy compound I selecting from aromatic epoxy compounds, alicyclic epoxy compounds, or a mixture thereof; b) from 0.4 wt. % to 10 wt. % an epoxy compound II selecting from acyclic aliphatic epoxy compounds; and c) from 1 wt. % to 40 wt. % a curing agent.

Preferably, the epoxy compound I is bisphenol A diglycidyl ether, bisphenol F diglycidyl ether, or a mixture thereof.

Preferably, the epoxy compound II is glycerol diglycidyl ether, poly(propylene glycol)diglycidyl ether with an average molecular weight (Mw) from 300 to 1000, or the mixture thereof.

Preferably, the curing agent is phenalkamine.

The present invention further provides a coating composition comprising, based on the total weight of the coating composition: a) from 30 wt. % to 50 wt. % a cured epoxy compound I; b) from 1 wt. % to 25 wt. % a cured epoxy compound II; and c) from 40 wt. % to 70 wt. % a filler.

DRAWINGS

DETAILED DESCRIPTION

Figure 1:
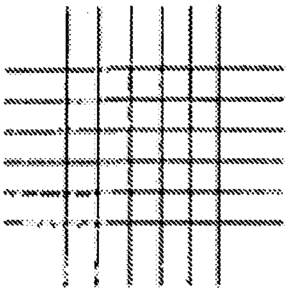
FIG. 1 depicts an exemplary surface of a cross-cut paint film having two sets of six parallel cuts at right angles to each other after the cross hatch tape test (ASTM D3359-02) with 0% of the paint film area removed.

As used herein, "a," "an," "the," "at least one," and "one or more" are used interchangeably. The term "and/or" means one, one or more, or all of the listed items. The recitations of numerical ranges by endpoints include all numbers subsumed within that range (e.g., 1 to 5 includes 1, 1.5, 2, 2.75, 3, 3.80, 4, 5, etc.).

For one or more embodiments, the curable compositions include an epoxy composition comprising an epoxy compound I and an epoxy compound II. A compound is a substance composed of atoms or ions of two or more elements in chemical combination and an epoxy compound is a compound in which an oxygen atom is directly attached to two adjacent or non-adjacent carbon atoms of a carbon chain or ring system. The epoxy compound I can be from 1 weight percent to 20 weight percent of the curable composition; for example the epoxy compound can be from 3 weight percent to 16 weight percent or from 5 weight percent to 12 weight percent of the curable composition. The epoxy compound II can be from 0.4 weight percent to 10 weight percent of the curable composition; for example the epoxy compound II can be from 1 weight percent to 8 weight percent or from 4 weight percent to 8 weight percent of the curable composition.

The epoxy compound I can be selected from the group consisting of aromatic epoxy compounds, alicyclic epoxy compounds, and combinations thereof.

The epoxy compound II can be selected from the group consisting of acyclic aliphatic epoxy compounds.

Examples of aromatic epoxy compounds include, but are not limited to, glycidyl ether compounds of polyphenols, such as hydroquinone, resorcinol, bisphenol A, bisphenol F, 4,4'-dihydroxybiphenyl, phenol novolac, cresol novolac, trisphenol (tris-(4-hydroxyphenyl)methane), 1,1,2,2-tetra(4-hydroxyphenyl)ethane, tetrabromobisphenol A, 2, 2-bis(4-hydroxyphenyl)-1,1,1,3,3,3-hexafluoropropane, 1,6-dihydroxynaphthalene, and combinations thereof.

Examples of alicyclic epoxy compounds include, but are not limited to, polyglycidyl ethers of polyols having at least one alicyclic ring, or compounds including cyclohexene oxide or cyclopentene oxide obtained by epoxidizing compounds including a cyclohexene ring or cyclopentene ring with an oxidizer. Some particular examples include, but are not limited to, hydrogenated bisphenol A diglycidyl ether; 3,4-epoxycyclohexylmethyl-3,4-epoxycyclohexyl carboxylate; 3,4-epoxy-1-methylcyclohexyl-3,4-epoxy-1-methylhexane carb xylate; 6-methyl-3,4-epoxycyclohexylmethyl-6-methyl-3,4-epoxycyclohexane carboxylate; 3,4-epoxy-3-methylcyclohexylmethyl-3,4-epoxy-3-methylcyclohexane carboxylate; 3,4-epoxy-5-methylcyclohexylmethyl-3,4-epoxy-5-methylcyclohexane carboxylate; bis(3,4-epoxycyclohexylmethyl)adipate; methylene-bis(3,4-epoxycyclohexane); 2,2-bis(3,4-epoxycyclohexyl)propane; dicyclopentadiene diepoxide; ethylene-bis(3,4-epoxycyclohexane carboxylate); dioctyl epoxyhexahydrophthalate; di-2-ethylhexyl epoxyhexahydrophthalate; and combinations thereof.

The term "acyclic aliphatic epoxy compound" refers to a hydrocarbon compound having linear structure (straight or branched) onto which epoxides are attached. Besides hydrogen, other elements can be bound to the carbon chain, the most common examples are oxygen, nitrogen, sulphur, and chlorine. The acyclic aliphatic epoxy resin may be a monoepoxide compound or a compound containing two or more epoxy groups. Preferably, the acyclic aliphatic epoxy resin has two or more epoxy groups. The acyclic aliphatic epoxy resin may include acyclic aliphatic epoxides modified with glycols.

Acyclic aliphatic epoxy compounds include three identified types, epoxidized diene polymers, epoxidized oils and derivatives, and polyglycol diepoxides.

Epoxidized diene polymers are epoxidation of polymers containing ethylenic unsaturation which can by prepared by copolymerizing one or more olefins, particularly diolefins, by themselves or with one or more alkenyl aromatic hydrocarbon monomers. The copolymers may, of course, be random, tapered, block or a combination of these, as well as linear, star of radial. Diene polymers can be epoxidized include, but are not limited to, polymers of butadiene alone, random copolymers of butadiene and styrene, random copolymers of butadiene and (meta)acrylonitrile, block copolymers of butadiene and styrene, random copolymers of isoprene and styrene, random copolymers of isoprene and (meta)acrylonitrile, block copolymers of isoprene and styrene, and copolymers of butadiene and isoprene. In some cases, the copolymers of butadiene and isoprene may include vinyl compounds such as styrene and (meta)acrylonitrile.

Epoxidized oils and derivatives are epoxidized fatty acid esters. The oils from which these products are derived are naturally occurring long chain fatty acid sources, and there is considerable overlap in the composition of the fatty acid portion of these products. They are primarily the $C_{18}$ acids: oleic, linoleic, and linolenic acid. The alcohols are primary alcohols, diols or triols. This category consists of related fatty acid esters. Fatty acids, tall-oil, epoxidized, 2-ethylhexyl esters (ETP) 9-Octadecanoic acid (Z)-, epoxidized, ester w/propylene glycol (EODA) Epoxidized soybean oil (ESBO) Epoxidized linseed oil (ELSO or ELO). ETP is a monoester with 2-ethylhexanol. EODA is a diester with propylene glycol. ESBO and ELSO are triesters with glycerol (triglycerides).

Polyglycol diepoxides can be presented as formula I. The preferred compounds of formula I include those derived from ethylene and propylene glycols, in particular ethylene glycol and polyethylene glycol, with an average molecular weight of from 100 to 1500, preferably 200 to 800, in particular 600. In formula I, m preferably signifies 7 to 30, more preferably 7 to 14.

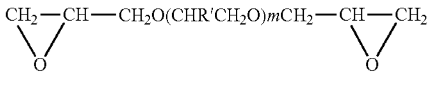

(I)

R' signifies hydrogen or methyl, and m signifies an integer of from 1 to 40,

Examples of polyglycol diepoxides include, but are not limited to, 1,4-butanediol diglycidyl ether, and 1,6-hexanediol diglycidyl ether; glycerol diglycidyl ether; a triglycidyl ether of glycerin; a triglycidyl ether of trimethylol propane; a tetraglycidyl ether of sorbitol; a hexaglycidyl ether of dipentaerythritol; a diglycidyl ether of polyethylene glycol, such as ethylene glycol diglycidyl ether, and diethylene glycol diglycidyl ether; and a diglycidyl ether of polypropylene glycol, such as, propylene glycol diglycidyl ether; polyglycidyl ethers of polyether polyols obtained by adding one type, or two or more types, of alkylene oxide to aliphatic polyols such as propylene glycol, trimethylol propane, and glycerin, such as, tripropylene glycol diglycidyl ether, and propylene glycol diglycidyl ether; diglycidyl esters of aliphatic long-chain dibasic acids; and combinations thereof.

An extensive enumeration of epoxy compounds useful in the present invention is found in Lee, H. and Neville, K., "Handbook of Epoxy Resins," McGraw-Hill Book Company, New York, 1967, Chapter 2, pages 257-307.

Preferably, the epoxy compound I is aromatic epoxy compound obtained from the reaction of epichlorohydrin and a polyol, such as 4,4'-isopropylidenediphenol (bisphenol-A), more preferably, it is bisphenol A diglycidyl ether, bisphenol F diglycidyl ether, or the mixture thereof. These epoxy resins are normally liquids or have a low molecular weight and are soluble in various aliphatic solvents such as ketones, esters, ether alcohols or any of the aromatic solvents such as xylene, ect.

Preferably, the epoxy compound I useful in the present invention for the preparation of the curable compositions, are selected from commercially available products. For example, D.E.R.™ 331, D.E.R.™ 332, D.E.R.™ 334, D.E.R.™ 337, D.E.R.™ 383, D.E.R.™ 580, D.E.R.™ 736, or D.E.R.™ 732 available from The Dow Chemical Company may be used. Most preferably, the epoxy compound I is a liquid epoxy resin, such as D.E.R.™ 331 having an average epoxide equivalent weight of 190 and D.E.R.™ 337 having an average epoxide equivalent weight of 240.

Preferably, the epoxy compound II is polyglycol diepoxides and polyglycol diepoxides modified with glycols, more preferably it is a diglycidyl ether of polypropylene glycol such as poly(propylene glycol)diglycidyl ether with an average molecular weight (Mw) from 300 to 1000 and glycerol diglycidyl ether.

For one or more embodiments, the curable compositions include a curing agent. The curing agent can be selected from the group consisting of novolacs, amines, anhydrides, carboxylic acids, phenols, thiols, and combinations thereof. The curing agent can be from 1 weight percent to 40 weight percent of the curable composition; for example the curing agent can be from 20 weight percent to 40 weight percent or from 25 weight percent to 35 weight percent of the curable composition.

For one or more of the embodiments, the curing agent can include a novolac. Examples of novolacs include phenol novolacs. Phenols can be reacted in excess, with formaldehyde in the presence of an acidic catalyst to produce phenol novolacs.

For one or more of the embodiments, the curing agent can include an amine. The amine can be selected from the group consisting of aliphatic polyamines, arylaliphatic polyamines, cycloaliphatic polyamines, aromatic polyamines, heterocyclic polyamines, polyalkoxy polyamines, dicyandiamide and derivatives thereof, aminoamides, amidines, ketimines, and combinations thereof. The preferred amine curing agents are the $C_2$-$C_{10}$ polyamines that contain two or more reactive hydrogen groups and amine-terminated polyamide compositions, including those formed through the condensation of unsaturated fatty acids with $C_2$-$C_{10}$ aliphatic polyamines having at least three amino groups per molecular. Sufficient amounts of the amine curing agent are employed to assure substantial crosslinking of the epoxide resin. Generally stoichiometric amounts or slight excess of the amine curing agent are employed Amine curing agents are normally used in amounts varying from 20-75 wt. percent based upon the type of the epoxy resin.

Examples of aliphatic polyamines include, but are not limited to, ethylenediamine (EDA), diethylenetriamine (DETA), triethylenetetramine (TETA), trimethyl hexane diamine (TMDA), hexamethylenediamine (HMDA), N-(2-aminoethyl)-1,3-propanediamine (N3-Amine), N,N'-1,2-ethanediylbis-1,3-propanediamine (4-amine), dipropylenetriamine, and reaction products of an excess of these amines with an epoxy resin, such as bisphenol A diglycidyl ether.

Examples of arylaliphatic polyamines include, but are not limited to, m-xylylenediamine (mXDA), and p-xylylenediamine. Examples of cycloaliphatic polyamines include, but are not limited to, 1,3-bisaminocyclohexylamine (1,3-BAC), isophorone diamine (IPDA), 4,4'-methylenebiscyclohexaneamine, and bis(secondary amine) like JEFFLINK®754 from Huntsman Chemical Company.

Examples of aromatic polyamines include, but are not limited to, m-phenylenediamine, diaminodiphenylmethane (DDM), and diaminodiphenylsulfone (DDS). Examples of heterocyclic polyamines include, but are not limited to, N-aminoethylpiperazine (NAEP), 3,9-bis(3-aminopropyl) 2,4,8,10-tetraoxaspiro(5,5)undecane, and combinations thereof.

Examples of polyalkoxy polyamines include, but are not limited to, 4,7-dioxadecane-1,10-diamine; 1-propanamine; (2,1-ethanediyloxy)-bis-(diaminopropylated diethylene glycol) (ANCAMINE® 1922 A); poly(oxy(methyl-1,2-ethanediyl)), alpha-(2-aminomethylethyl)omega-(2-aminomethylethoxy) (JEFFAMINE® SD-231, SD-401, SD-2001); triethyleneglycoldiamine; and oligomers (JEFFAMINE® EDR-148, EDR-176); poly(oxy(methyl-1,2-ethanediyl)), alpha, alpha'-(oxydi-2,1-ethanediyl)bis(omega-(aminomethylethoxy)) (JEFFAMINE® XTJ-511); bis(3-aminopropyl)polytetrahydrofuran 350; bis(3-aminopropyl) polytetrahydrofuran 750; poly(oxy(methyl-1,2-ethanediyl)); a-hydro-ro-(2-aminomethylethoxy) ether with 2-ethyl-2-(hydroxymethyl)-1,3-propanediol (JEFFAMINE® T-403); diaminopropyl dipropylene glycol; and combinations thereof.

Examples of dicyandiamide derivatives include, but are not limited to, guanazole, phenyl guanazole, cyanoureas, and combinations thereof.

Examples of aminoamides include, but are not limited to, amides formed by reaction of the above aliphatic polyamines with a stoichiometric deficiency of anhydrides and carboxylic acids, as described in U.S. Pat. No. 4,269,742.

Examples of amidines include, but are not limited to, carboxamidines, sulfinamidines, phosphinamidines, and combinations thereof.

Examples of ketimines include compounds having the structure $(R^2)_2C{=}NR^3$, where each $R^2$ is an alkyl group and $R^3$ is an alkyl group or hydrogen, and combinations thereof.

For one or more of the embodiments, the curing agent can include phenalkamine. Phenalkamine is the condensation product of an alkyl phenol, aldehyde and one more at least difunctional amines and are known by the skilled man as Mannich bases: the reaction product of an aldehyde, such as formaldehyde, amine and an alkyl phenol (see WO 2004/024792 A1, page 3, lines 16-18). Useful amines include ethylenediamine (EDA), diethyltriamine (DETA) (see WO 2004/024792 A1, page 3, lines 18-19), triethylenetetramine (TETA), tetraethylenepentamine (TEPA), m-xylylendiamine (MXDA), isophorone diamine, and the mixture thereof. Most preferably, a mixture of TETA and TEPA is used as amine mixture; the alkyl phenol is a cardanol-containing extract derived from cashew nutshell liquid (see WO 2004/024792 A1, page 3, lines 19-20).

For one or more of the embodiments, the curing agent can include an anhydride. An anhydride is a compound having two acyl groups bonded to the same oxygen atom. The anhydride can be symmetric or mixed. Symmetric anhydrides have identical acyl groups. Mixed anhydrides have different acyl groups. The anhydride is selected from the group consisting of aromatic anhydrides, alicyclic anhydrides, aliphatic anhydride, polymeric anhydrides, and combinations thereof.

Examples of aromatic anhydrides include, but are not limited to, 3,3',4,4'-benzophenonetetracarboxylic dianhydride, pyromellitic anhydride, and combinations thereof.

Examples of alicyclic anhydrides include, but are not limited to methyltetrahydrophthalic anhydride, tetrahydrophthalic anhydride, methyl nadic anhydride, hexahydrophthalic anhydride, methylhexahydrophthalic anhydride, and combinations thereof.

Examples of aliphatic anhydrides include, but are not limited to, propionic anhydride, acetic anhydride, and combinations thereof.

Example of a polymeric anhydrides include, but are not limited to, polymeric anhydrides produced from copolymerization of maleic anhydride such as poly(styrene-co-maleic anhydride) copolymer, and combinations thereof.

For one or more of the embodiments, the curing agent can include a carboxylic acid. Examples of carboxylic acids include oxoacids having the structure $R^4C({=}O)OH$, where $R^4$ is an alkyl group or hydrogen, and combinations thereof.

For one or more of the embodiments, the curing agent can include a phenol. Examples of phenols include, but are not limited to, bisphenols, novolacs, and resoles that can be derived from phenol and/or a phenol derivative, and combinations thereof.

For one or more of the embodiments, the curing agent can include a thiol. Examples of thiols include compounds having the structure $R^5SH$, where $R^5$ is an alkyl group, and combinations thereof.

For one or more embodiments, the curable compositions can include a catalyst. Examples of the catalyst include, but are not limited to, 2-methyl imidazole, 2-phenyl imidazole, 2-ethyl-4-methyl imidazole, 1-benzyl-2-phenylimidazole, boric acid, triphenylphosphine, tetraphenylphosphonium-tetraphenylborate, and combinations thereof. The catalyst can be used in an amount of from 0.01 to 5 parts per hundred parts of the epoxy compound; for example the catalyst can be used in an amount of from 0.05 to 4.5 parts per hundred parts of the epoxy compound or 0.1 to 4 parts per hundred parts of the epoxy compound.

For one or more embodiments, the curable compositions can include an inhibitor. The inhibitor can be a Lewis acid. Examples of the inhibitor include, but are not limited to, boric acid, halides, oxides, hydroxides and alkoxides of zinc, tin, titanium, cobalt, manganese, iron, silicon, boron, aluminum, and combinations thereof. Boric acid as used herein refers to boric acid or derivatives thereof, including metaboric acid and boric anhydride. The curable compositions can contain from 0.3 mole of inhibitor per mole of catalyst to 3 mole of inhibitor per mole of catalyst; for example the curable compositions can contain from 0.4 moles of inhibitor per mole of catalyst to 2.8 mole of inhibitor per mole of catalyst or 0.5 mole of inhibitor per mole of catalyst to 2.6 mole of inhibitor per mole of catalyst.

The curable composition may also include one or more optional additives conventionally found in epoxy resin systems to form the coating composition of the present invention. For example, the curable composition of the present invention may contain additives such as nonreactive and reactive diluents; catalyst; other curing agents; other resins; fibers; coloring agents; thixotropic agents, photo initiators; latent photo initiators, latent catalysts; inhibitors; flow modifiers; accelerators; desiccating additives; surfactants; adhesion promoters; fluidity control agents; stabilizers; ion scavengers; UV stabilizers; flexibilizers; fire retardants; diluents that aid processing; toughening agents; wetting agents; mold release agents; coupling agents; tackifying agents; and any other substances which are required for the manufacturing, application or proper performance of the composition.

Fillers are used to control the viscosity, rheology, shelf stability, specific gravity and cured performance properties, such as corrosion resistance, impact resistance and abrasion resistance. The fillers may be spherical or platy. As used herein platy means the particles have a high aspect ratio. High aspect ratio fillers include as talc, mica and graphite. Preferred high aspect ratio fillers include mica having a median particle size of 20 to 70 microns (micrometers) and most preferably 50 microns (micrometers). Examples of fillers include such as wollastonite, barites, mica, feldspar, talc, silica, crystalline silica, fused silica, fumed silica, glass, metal powders, carbon nanotubes, grapheme, calcium carbonate, and barium sulphate; aggregates such as glass beads, polytetrafluoroethylene, polpol resins, polyester resin, phenolic resins, graphite, molybdenum disulfide and abrasive pigments; viscosity reducing agents; boron nitride; nucleating agents; dyes; pigments such as titanium dioxide, carbon black, iron oxides, chrome oxide, and organic pigments.

The coating composition of the present invention is made by batch mixing the necessary components under high speed, high shear agitation. The process includes three steps: all liquid resins, curatives and platy fillers are mixed first for 20 minutes and degassed at 30 mHg; spherical fillers and glass spheres are added and the mixture is mixed for 20 minutes and degassed at 30 mmHg; fumed silica is then added and the mixture is mixed for 10 minutes and degassed at 30 mmHg.

Other information related with the coating preparation is listed in patent: US20100048827(A1).

The coating composition of the present invention comprises based on the total weight of the coating composition a) from 30 wt. % to 50 wt. %, preferable from 35 wt. % to 45 wt. %, most preferably from 30 wt. % to 40 wt. %, a cured epoxy compound I; b) from 1 wt. % to 25 wt. %, preferably from 5 wt. % to 20 wt. %, most preferably from 10 wt. % to 15 wt. %, a cured epoxy compound II; and c) from 40 wt. % to 70 wt. %, preferably from 45 wt. % to 65 wt. %, most preferably from 50 wt. % to 60 wt. %, a filler.

EXAMPLES

I. Raw Materials

TABLE 1

Starting materials used in paint formulation

| Material | Function | Chemical nature | Supplier |
|---|---|---|---|
| Xylene | Solvent | $C_6H_4(CH_3)_2$ | Sinopharm Chemical Reagent Co., Ltd |
| BYK-P 104 S | wetting and dispersing additive | / | BYK Company |
| Cravallac Ultra | Rheology modifier | / | Sinopharm Chemical Reagent Co., Ltd |
| N-butanol | Solvent | $C_4H_{10}O$ | Sinopharm Chemical Reagent Co., Ltd |
| Titanium Dioxide Universal | Pigment | $TiO_2$ | Sinopharm Chemical Reagent Co., Ltd |
| D.E.R. 337-X-80 | Epoxy | 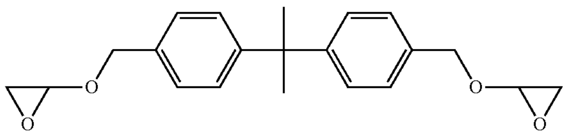 [SMILES: CC(C)(c1ccc(COC2CO2)cc1)c1ccc(COC2CO2)cc1] | DOW Chemical Company |
| Mica filler | Filler | $SiO_2$, MgO | Sinopharm Chemical Reagent Co., Ltd |
| D.E.R. 331 | Epoxy | 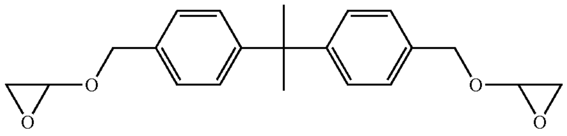 [SMILES: CC(C)(c1ccc(COC2CO2)cc1)c1ccc(COC2CO2)cc1] | Sinopharm Chemical Reagent Co., Ltd |
| Barium sulphate | Filler | $BaSO_4$ | Sinopharm Chemical Reagent Co., Ltd |
| Silica powder | Filler | $SiO_2$ | Sinopharm Chemical Reagent Co., Ltd |

TABLE 1-continued

| Starting materials used in paint formulation | | | |
|---|---|---|---|
| Material | Function | Chemical nature | Supplier |
| Phenalkamine | Curing agent | 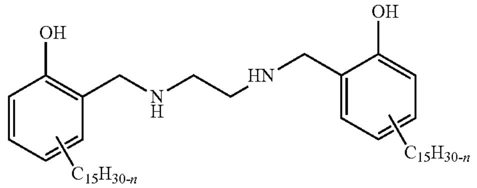 | Aldrich |
| Glycerol diglycidyl ether | Epoxy | 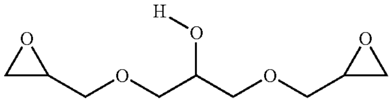 [SMILES: OC(COCC1CO1)COCC1CO1] | Aldrich |
| Poly(propylene glycol) diglycidyl ether | Epoxy | 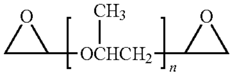 | Aldrich |
| JEFFAMINE ® SD-401 | Curing agent | / | Huntsman International LLC Company |
| JEFFLINK ® 754 | Curing agent | / | Huntsman International LLC Company |

II. Test Procedures

Figure 2:
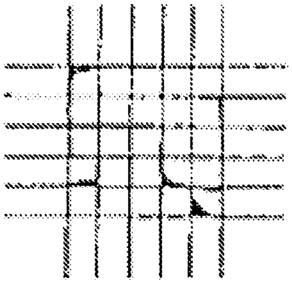
FIG. 2 depicts an exemplary surface of a cross-cut paint film having two sets of six parallel cuts at right angles to each other after the cross hatch tape test (ASTM D3359-02) with less than 5% of the paint film area removed.
Figure 3:
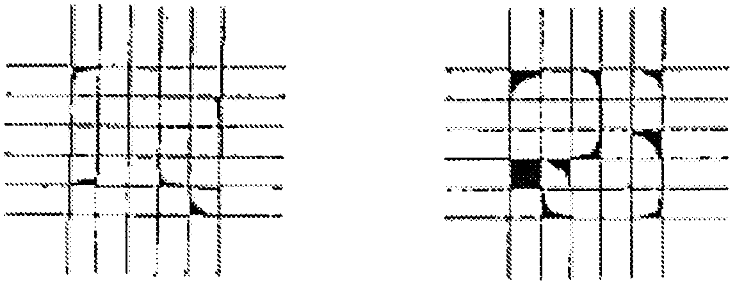
FIG. 3 depicts two exemplary surfaces of cross-cut paint film having two sets of six parallel cuts at right angles to each other after the cross hatch tape test (ASTM D3359-02) with 5-15% of the paint film area removed.
Figure 4:
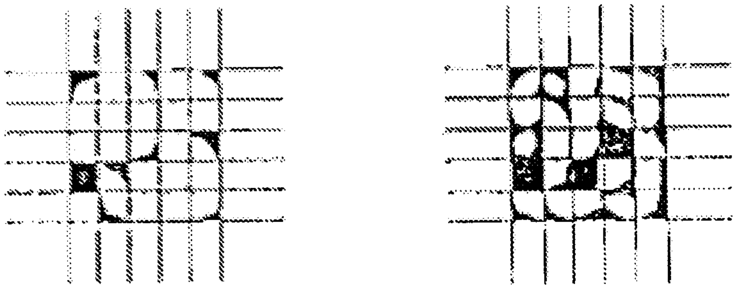
FIG. 4 depicts two exemplary surfaces of cross-cut paint film having two sets of six parallel cuts at right angles to each other after the cross hatch tape test (ASTM D3359-02) with 15-35% of the paint film area removed.
Figure 5:
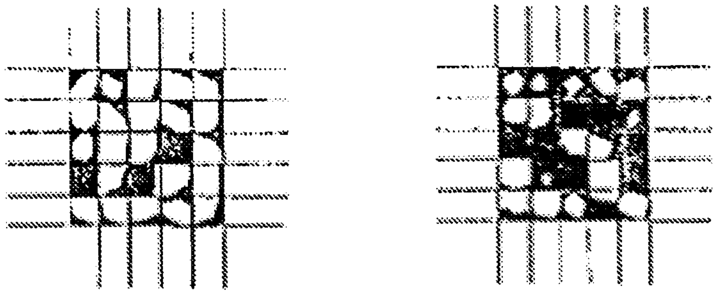
FIG. 5 depicts two exemplary surfaces of cross-cut paint film having two sets of six parallel cuts at right angles to each other after the cross hatch tape test (ASTM D3359-02) with 35-65% of the paint film area removed.

Overcoat window was determined by cross hatch tape test according to ASTM D3359-02 following the assessment protocol as:

a) Apply coatings onto Q-panels at a wet film thickness of 200 um;
b) Allow each coating to achieve a tack free state;
c) Age coatings under natural light for a set period (1 day to 6 months);
d) Top coat with acrylic surface coat at a wet film thickness of 200 um;
e) Cure at room temperature for at least 5 days;
f) Subject to the cross hatch tape test;

The definition of the overcoat window:

The overcoat window was determined by the adhesion test result by cross hatch tape test. The different classifications of cross hatch tape test were listed in Table 2. Images of exemplary surfaces of cross-cut paint films having two sets of six parallel cuts at right angles to each other after the cross hatch tape test (ASTM D3359-02) for Classifications 5B, 4B, 3B, 2B, and 1B are provided in FIG. 1-5, respectively. Overcoat window was determined when the adhesion between top coat and primer begin to decrease from 5B to 4B.

TABLE 2

| Cross Hatch Tape Test (ASTM D3359-02) | |
|---|---|
| Classification | Percent Area Removed |
| 5B | 0% (None) |
| 4B | Less than 5% |
| 3B | 5-15% |
| 2B | 15-35% |
| 1B | 35-65% |

Chemical resistance test and salt spray resistance test were also conducted to evaluate anti-corrosion performance.

Chemical Resistance Test:

Tampons were stained with 10 wt. % sodium hydroxide solution or 10 wt. % sulfuric acid solution and put onto coating surface for different days. Plastic bottles were used to cover up the health cottons with chemicals to restrict water evaporation. Four rate scales were used:

E: Excellent G: Good F: Fair P: Poor

TABLE 3

| Standard test method for evaluating degree of blistering of paints (ASTM D714-02), 5% NaCl salt spary test. | | | | |
|---|---|---|---|---|
| Rust | | Visual Examples | | |
| Grade | Percent of surface rusted | Spot(s) | General(G) | PinPoint(P) |
| 10 | Less than or equal to 0.01 percent | | | |
| 9 | Greater than 0.01 percent and up to 0.03 percent | 9-S | 9-G | 9-P |
| 8 | Greater than 0.03 percent and up to 0.1 percent | 8-S | 8-G | 8-P |
| 7 | Greater than 0.1 percent and up to 0.3 percent | 7-S | 7-G | 7-P |
| 6 | Greater than 0.3 percent and up to 1.0 percent | 6-S | 6-G | 6-P |
| 5 | Greater than 0.01 percent and up to 0.03 percent | 5-S | 5-G | 5-P |
| 4 | Greater than 3.0 percent and up to 10.0 percent | 4-S | 4-G | 4-P |
| 3 | Greater than 10.0 percent and up to 16.0 percent | 3-S | 3-G | 3-P |
| 2 | Greater than 16.0 percent and up to 33.0 percent | 2-S | 2-G | 2-P |
| 1 | Greater than 33.0 percent and up to 50.0 percent | 1-S | 1-G | 1-P |
| 0 | Greater than 50.0 percent | | None | |

III. Examples

Primers were prepared according to the formulation listed in Table 4. Solid content is 77%, the epoxide group content is 1.145 mmol/g.

TABLE 4

| Primer formulations | |
|---|---|
| Component | wt. % |
| Xylene (solvent) | 16.33 |
| BYK-P 104 S (wetting and dispersing additive) | 0.35 |
| Cravallac Ultra (Rheology modifier) | 0.92 |
| N-butanol (solvent) | 1.42 |
| Titanium Dioxide Universal (pigment) | 2.30 |
| D.E.R. 337-X-80 (epoxy) | 5.83 |
| Micr (filler) | 5.38 |
| D.E.R. 331 (epoxy) | 11.57 |
| Barium sulphate (filler) | 14.17 |
| Silica powder (filler) | 21.47 |

Example 1

Charged 14.26 g primer (77% solid) and 0.09 g glycerol diglycidyl ether (GDGE for short) (Sigma-Aldrich) and 6.67 g phenalkamine curing agent, stirred for 10 minutes. The thoroughly mixed solution was removed from the mixer and allowed to stay static for 2-5 minutes to remove gas bubbles. The above formulation was coated using blade coater on a Q-panel. A wet coating with a thickness of 200 μm was applied to clean Q-panels (H.J. Unkel LTD. Company). The coated panels were allowed to dry at room temperature for a set period prior to coating with top coat. Cross hatch tape test was conducted when top coat was completely dried.

Example 2

12 g Primer (77% solid) and 0.7 g GDGE (Sigma-Aldrich) and 6.67 g phenalkamine curing agent were charged. The preparing process is the same as in Example 1. The coated panels were allowed to dry at room temperature for a set period prior to coating with top coat. Cross hatch tape test was conducted when top coat was completely dried. Salt spray test and chemical resistance test were also conducted to evaluate the anti-corrosion performance.

Example 3

9 g Primer (77% solid) and 1.4 g GDGE (Sigma-Aldrich) and 6.67 g phenalkamine curing agent were charged. The preparing process is the same as in Example 1. The coated panels were allowed to dry at room temperature for a set period prior to coating with top coat. Cross hatch tape test was conducted when top coat was completely dried. Salt spray test and chemical resistance test were also conducted to evaluate the anti-corrosion performance.

Example 4

13.5 g Primer (77% solid) and 0.33 g poly(propylene glycol)diglycidyl ether (PPO for short)(Sigma-Aldrich, Mn=380) and 6.67 g phenalkamine curing agent were charged. The preparing process is the same as in Example 1. The coated panels were allowed to dry at room temperature for a set period prior to coating with top coat. Cross hatch tape test was conducted when top coat was completely dried. Salt spray test and chemical resistance test were also conducted to evaluate the anti-corrosion performance.

Example 5

12 g Primer (77% solid) and 0.65 g PPO (Sigma-Aldrich, Mn=380) and 6.67 g phenalkamine curing agent were charged. The preparing process is the same as in Example 1. The coated panels were allowed to dry at room temperature for a set period prior to coating with top coat. Cross hatch tape test was conducted when top coat was completely dried. Salt spray test and chemical resistance test were also conducted to evaluate the anti-corrosion performance.

Example 6

9 g Primer (77% solid) and 1.3 g PPO (Sigma-Aldrich, Mn=380) and 6.67 g phenalkamine curing agent were charged. The preparing process is the same as in Example 1. The coated panels were allowed to dry at room temperature for a set period prior to coating with top coat. Cross hatch tape test was conducted when top coat was completely dried. Salt spray test and chemical resistance test were also conducted to evaluate the anti-corrosion performance.

Example 7

15 g Primer (77% solid) and 0.89 g JEFFAMINE® SD-401 (Huntsman Performance Products) and 6.31 g phenalkamine curing agent were charged. The preparing process is the same as in Example 1. The coated panels were allowed to dry at room temperature for a set period prior to coating with top coat. Cross hatch tape test was conducted when top coat was completely dried. Salt spray test and chemical resistance test were also conducted to evaluate the anti-corrosion performance.

Example 8

15 g Primer (77% solid) and 1.76 g JEFFAMINE® SD-401 (Huntsman Performance Products) and 4.61 g phenalkamine curing agent were charged. The preparing process is the same as in Example 1. The coated panels were allowed to dry at room temperature for a set period prior to coating with top coat. Cross hatch tape test was conducted when top coat was completely dried. Salt spray test and chemical resistance test were also conducted to evaluate the anti-corrosion performance.

Example 9

15 g Primer (77% solid) and 0.43 g JEFFLINK®754 (Huntsman Performance Products) and 6.22 g phenalkamine curing agent were charged. The preparing process is the same as in Example 1. The coated panels were allowed to dry at room temperature for a set period prior to coating with top coat. Cross hatch tape test was conducted when top coat was completely dried. Salt spray test and chemical resistance test were also conducted to evaluate the anti-corrosion performance.

Comparative Example 1

15 g Primer (77% solid) and 6.67 g phenalkamine curing agent were charged. The preparing process is the same as in Example 1. The coated panels were allowed to dry at room temperature for a set period prior to coating with top coat. Cross hatch tape test was conducted when top coat was completely dried. Salt spray test and chemical resistance test were also conducted to evaluate the anti-corrosion performance.

Comparative Example 2

6.2 g Primer (77% solid) and 2.8 g GDGE (Sigma-Aldrich) and 6.67 g phenalkamine curing agent were charged. The preparing process is the same as in Example 1. The coated panels were allowed to dry at room temperature for a set period prior to coating with top coat. Cross hatch tape test was conducted when top coat was completely dried. Salt spray test and chemical resistance test were also conducted to evaluate the anti-corrosion performance.

Comparative Example 3

6.2 g Primer (77% solid) and 2.6 g PPO (Sigma-Aldrich, Mn=380) and 6.67 g phenalkamine curing agent were charged. The preparing process is the same as in Example 1. The coated panels were allowed to dry at room temperature for a set period prior to coating with top coat. Cross hatch tape test was conducted when top coat was completely dried. Salt spray test and chemical resistance test were also conducted to evaluate the anti-corrosion performance.

IV. Results

TABLE 5

Coating properties from the examples

| Example | Epoxy I | Epoxy II | curing agent | Overcoat window time (d) | Alkali resistance (10% NaOH) | Acid resistance (10% $H_2SO_4$) | Salt spray test, Rust grade (1000 h) | Impact resistance (cm/lb), Q-panel | Pendulum Hardness | Tg (° C.) | Contact angle (°) |
|---|---|---|---|---|---|---|---|---|---|---|---|
| Comp. 1 | D.E.R. 331 + D.E.R. 337 | None | phenalkamine | 7 | P | E | 5 | 70 | 119 | 71.8 | 54.1 |
| Comp. 2 | D.E.R. 331 + D.E.R. 337 | GDGE | phenalkamine | 60 | P | F | 5 | 80 | 140 | 64.5 | 78.3 |
| Comp. 3 | D.E.R. 331 + D.E.R. 337 | PPO | phenalkamine | 60 | F | P | 5 | 90 | 130 | 57 | 65.2 |
| 1 | D.E.R. 331 + D.E.R. 337 | GDGE | phenalkamine | 21 | G | E | 5 | 90 | 111 | 67.6 | 66.1 |
| 2 | D.E.R. 331 + D.E.R. 337 | GDGE | phenalkamine | 30 | G | E | 5 | 76 | 133 | 65.8 | 68.6 |
| 3 | D.E.R. 331 + D.E.R. 337 | GDGE | phenalkamine | >60 | F | G | 7 | 80 | 147 | 64.7 | 75.7 |
| 4 | D.E.R. 331 + D.E.R. 337 | PPO | phenalkamine | 30 | G | E | 7 | 80 | 146 | 67.2 | 77.9 |
| 5 | D.E.R. 331 + D.E.R. 337 | PPO | phenalkamine | 30 | G | E | 8 | 86 | 143 | 64.8 | 58.7 |
| 6 | D.E.R. 331 + D.E.R. 337 | PPO | phenalkamine | 60 | G | G | 7 | 90 | 127 | 58.3 | 67.8 |
| 7 | D.E.R. 331 + D.E.R. 337 | None | Phenalkamine + JEFFAMINE ® SD-401 | 21 | G | E | 5 | 100 | 137 | 67.1 | 60.3 |
| 8 | D.E.R. 331 + D.E.R. 337 | None | Phenalkamine + JEFFAMINE ® SD-401 | 45 | G | G | 6 | 110 | 116 | 65.2 | 60.4 |
| 9 | D.E.R. 331 + D.E.R. 337 | None | Phenalkamine + JEFFLINK ®754 | 30 | G | E | 6 | 60 | 132 | 66.3 | 58.7 |

Table 5 summarizes the properties of various coatings used in this research. With GDGE (Example 1-3) or PPO (Example 4-6) replacing part of D.E.R.331 or D.E.R.337, coatings have wider overcoatability windows without losing their anti-corrosion properties and chemical resistant properties comparing to Comparative Example 1. But the chemical resistance properties degrade when excess GEGE or PPO replace D.E.R.331 or D.E.R.337, see Comparative Example 2 and 3. Glass transition temperature (Tg) of modified primers in Examples 1-6 decreased a little comparing to that of Comparative Example 1. The impact resistance, Pendulum hardness and contact angles of the coatings (Examples 1-6) cured for 30 days at room temperature were also tested with acceptable variance and listed in Table 5. With JEFFAMINE® SD-401(Examples 7, and 8), JEFFLINK® 754 (Example 9) being co-curing agents, and replacing part of basic agents, coatings have improved overcoatability windows and slightly improved anti-corrosion properties and chemical resistance ability although the curing velocity is relatively slower due to lower activity of secondary amine groups in the structure. Glass transition temperature (Tg) of primers with JEFFAMINE® SD-401(Examples 7, and 8), JEFFLINK®754 (Example 9) as co-curing agents decreased a little comparing to that of Comparative example 1. The impact resistance, Pendulum hardness and contact angles of the coatings cured for 30 days at room temperature were tested with acceptable variance and listed in Table 5.

The invention claimed is:

1. A curable composition comprising:

a) an epoxy component I, wherein the epoxy component I consists of at least one aromatic epoxy compound, at least one alicyclic epoxy compound, or a mixture thereof;

b) an epoxy component II, wherein the epoxy component II consists of at least one acyclic aliphatic epoxy compound; and c) a phenalkamine curing agent;

wherein the epoxy compounds of epoxy component I and the epoxy compounds of epoxy component II are the only epoxy compounds present in the curable composition;

wherein the phenalkamine curing agent is the only curing agent present in the curable composition;

wherein the epoxy component I is present in an amount of 1 wt. % to 20 wt. %, based on the total weight of the curable composition;

wherein the epoxy component II is present in an amount of 0.4 wt. % to 10 wt. %, based on the total weight of the curable composition; and wherein the phenalkamine curing agent is present in an amount of 20 wt. % to 40 wt. %, based on the total weight of the curable composition.

2. The curable composition according to claim 1 wherein the epoxy component I consists of at least one bisphenol A diglycidyl ether, at least one bisphenol F diglycidyl ether, or a mixture thereof.

3. The curable composition according to claim 1 wherein the epoxy component II consists of at least one glycerol diglycidyl ether, at least one poly(propylene glycol)diglycidyl ether with an average molecular weight (Mw) from 300 to 1000, or a mixture thereof.

* * * * *